A. FRICKER.

BITUMINOUS DISTRIBUTER.

APPLICATION FILED MAY 8, 1919.

Reissued June 17, 1919.

14,668.

Inventor,
Anthony Fricker
By Brickett and Hyde
Attys.

UNITED STATES PATENT OFFICE.

ANTHONY FRICKER, OF LAKEWOOD, OHIO.

BITUMINOUS DISTRIBUTER.

14,668. Specification of Reissued Letters Patent. Reissued June 17, 1919.

Original No. 1,297,136, dated March 11, 1919, Serial No. 193,447, filed September 27, 1917. Application for reissue filed May 8, 1919. Serial No. 295,792.

*To all whom it may concern:*

Be it known that I, ANTHONY FRICKER, a citizen of the United States, and resident of Lakewood, in the county of Cuyahoga and State of Ohio, have invented new and useful Improvements in Bituminous-Distributers, of which the following is a description, reference being had to the accompanying drawings, which are a part of this specification.

The invention relates to machines for distributing bituminous material, such as asphalt and petroleum products for road making.

The invention is more particularly designed to provide mechanism for controlling the pressure upon the material in the discharge manifold by means of a valve in a by-pass leading back to the source of supply and also for insuring the efficient heating of the manifold by the circulation of material through it.

The invention further consists in the several features hereinafter set forth.

Figure 1:
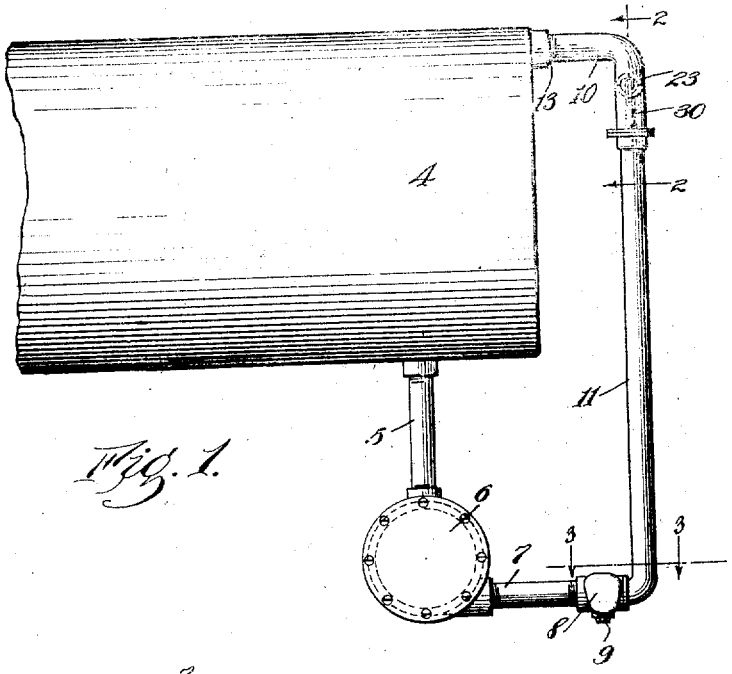
Figure 3:
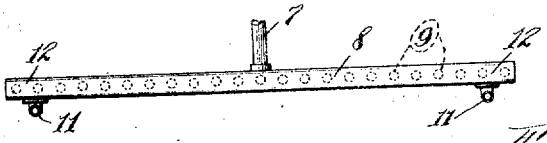
Figure 2:
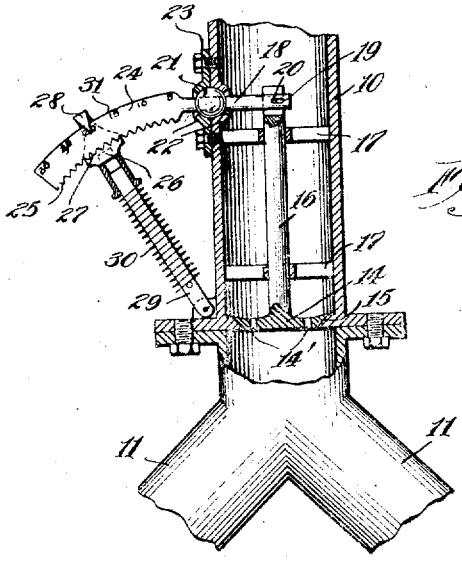

In the drawings, Figure 1 is a view of the device embodying the invention shown in connection with the storage or supply tank; Fig. 2 is a section taken on the line 2—2 of Fig. 1; Fig. 3 is a section taken on the line 3—3 of Fig. 1.

In the drawings, the numeral 4 represents the supply tank for the bituminous material. Owing to the character of this material it has to be heated by heaters (not shown) but which are well understood by persons skilled in this art.

The material from the tank 4 passes through a pipe 5 to a pump 6, of any suitable construction from which it is delivered through a pipe 7 into the central portion of what is termed the manifold 8. This manifold is provided with a plurality of discharge nozzles 9, through which the material is discharged onto the road through the operation of suitable valves (not shown), one form of valve being shown in Letters Patent No. 1,297,135, granted me March 11, 1919.

In applying the material of this kind it is necessary to keep the manifold heated and also to control the delivery pressure from the manifold to suit different requirements of the work to deliver more or less material in a given period through the nozzles 9. To accomplish this purpose I have provided a by-pass pipe 10 having branches 11 leading to the ends 12 of the manifold and connected at its upper end 13 to the tank 4. With this construction it will be apparent that some of the material delivered by the pump 6 will flow under pressure from the pipe 7 into the manifold and through it into the branches 11 of the by-pass pipe 10 and thence back to the supply tank 4 and that there will therefore be a constant circulation of heated material through the manifold to heat the same and prevent any tendency of the material, which readily congeals under ordinary temperatures, from clogging the manifold.

To regulate the pressure by which the material is delivered from the manifold and consequently the quantity delivered through the nozzles 9 in any given period I have provided a valve in the by-pass 10 which may be set by the operator to suit the conditions of the work.

This valve consists of a conical valve member 14 adapted to seat on a conical seat 15 formed in the by-pass pipe and provided with a stem 16 vertically slidably movable in guides 17 in the interior of the pipe. The member 14 is provided with holes 14′ to allow material in the by-pass to drain back into the manifold and prevent clogging of the valve. The means for setting this valve comprises a lever 18 having a slot 19 at one end in which a pin 20 secured to the stem 16 is mounted and having a ball shaped portion 21 intermediate its ends seated in a ball casing 22 formed in the pipe 10 and a member 23 so that the lever 18 may be swung vertically to open and close the valve. The lever 18 also has a curved portion 24 provided with teeth 25 on its under side which are adapted to be engaged by a setting member 26 having teeth 27 and a pointer 28 and slidably mounted on the free end of a rod 29 pivoted at its lower end to the pipe 10, the member 26 being held in engagement with the lever 18 by a coiled spring 30 mounted on the rod and bearing upon the member 26 to press its teeth 27 into engagement with the teeth 25 on the lever 18. The portion 24 of the lever is provided with a scale 31 representing pressures.

With the foregoing arrangement when the member 26 is set so that the pointer 28 registers with the scale designation "5" the relation of the lever arm 18 to the curved part of the arm 24 on the other side of the ball pivot 21 is such that the pressure of the spring 30 will hold the valve 14 to its seat with a pressure of 5 pounds per square inch. Consequently the pressure created by the pump in the manifold 8 must rise to at least 5 pounds per square inch before the valve 14 opens. In practice the pressure is maintained above this point so that the valve 14 will of necessity open and allow the flow of some material past said valve through the by-pass 10 and thence into the main supply tank 4. Material will therefore be discharged from the nozzles in the manifold at a pressure of not to exceed 5 pounds per square inch. Any greater pressure is dissipated by greater opening of valve 14 and increased circulation of the excess material back to the reservoir.

If the member 26 is moved so as to bring the pointer 28 from the designation "5" to the designation "20" the effective length of the lever arm 24 is increased, so that the valve 14 is held to its seat by an increased effect of the pressure spring 30, and in this particular instance at a pressure of 20 pounds per square inch. The effect is exactly the same as before except that material is discharged from the manifold at the higher pressure of 20 pounds per square inch, and the pressure must exceed this amount before the valve opens. In practice, as before stated, the pressure is made to exceed this amount so as to produce return circulation of some portion of the material back to the main supply tank 4.

The net effect is to maintain in the manifold and branch pipes 11 a definite pressure corresponding to the location of the pointer 28 along the scale, and as the rate of discharge from the nozzles depends upon the pressure of the material in the manifold, the quantity of material discharged upon the roadway can be adjusted to and maintained at varying rates directly proportional to the indications on the scale 31, as will be readily understood.

The circulation of material through the manifold and back to the supply which is maintained by always keeping the pressure of the pump 6 somewhat in excess of the effective pressure of the spring 30 keeps the manifold heated so that the material will not congeal and thereby clog the nozzles 9.

The invention thus exemplifies a device for controlling the pressure upon the material in the manifold to regulate the discharge and for insuring efficient heating of the manifold by the circulation of material through it.

I am aware that the details of construction herein shown and described are subject to some modification and change but such changes as come within the scope of the appended claims I deem to be within the spirit of my invention.

What I claim as my invention is:

1. In a bituminous distributer, the combination, with the supply tank thereof, of a discharge manifold provided with outlets, piping connecting said tank with the central portion of the manifold, and a by-pass pipe communicating with the supply tank and having branches leading to the ends of the manifold.

2. In a bituminous distributer, the combination with the supply tank thereof, of a discharge manifold, means for introducing material from the tank into the intermediate portion of the manifold and for conducting the material from the ends of the manifold back to the supply tank.

3. In a bituminous distributer, the combination, with the supply tank thereof, of a discharge manifold provided with outlets, piping connecting said manifold with said tank including a pump for delivering material from the tank to the manifold under pressure, a by-pass leading from the manifold to the tank, and a valve in the by-pass for regulating the pressure of the material within the manifold, said valve having drainage openings therein.

4. In a bituminous distributer, the combination, with the supply tank, of a discharge manifold provided with outlets, means for delivering the material from the tank to the manifold under pressure, a by-pass leading from the manifold to the tank, a valve in said by-pass for regulating the pressure of the material within the manifold, and means for permitting drainage of the material from the valve.

In testimony whereof I hereunto affix my signature.

ANTHONY FRICKER.